US011452025B2

(12) United States Patent
Pillay-Esnault

(10) Patent No.: US 11,452,025 B2
(45) Date of Patent: *Sep. 20, 2022

(54) PREDICTIVE ROUTING FOR MOBILITY

(71) Applicant: Futurewei Technologies, Inc., Plano, TX (US)

(72) Inventor: Padmadevi Pillay-Esnault, Santa Clara, CA (US)

(73) Assignee: Futurewei Technologies, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/130,855

(22) Filed: Dec. 22, 2020

(65) Prior Publication Data

US 2021/0112480 A1   Apr. 15, 2021

Related U.S. Application Data

(63) Continuation of application No. 16/445,522, filed on Jun. 19, 2019, now Pat. No. 10,897,734, which is a
(Continued)

(51) Int. Cl.
*H04W 40/20* (2009.01)
*H04L 45/74* (2022.01)
(Continued)

(52) U.S. Cl.
CPC ............. *H04W 40/20* (2013.01); *H04L 45/16* (2013.01); *H04L 45/74* (2013.01); *H04W 64/006* (2013.01); *H04L 45/02* (2013.01)

(58) Field of Classification Search
CPC ... H04L 45/16; H04L 61/103; H04L 61/2084; H04L 45/02; H04L 45/74; H04W 64/006; H04W 40/20; G06F 15/17
See application file for complete search history.

(56) References Cited

U.S. PATENT DOCUMENTS 6,587,689 B1   7/2003 Panasik
7,245,619 B1   7/2007 Guan et al.
(Continued)

FOREIGN PATENT DOCUMENTS

CN   102868599 A   1/2013
CN   103037360 A   4/2013
(Continued)

OTHER PUBLICATIONS

Farinacci, D., "LISP Predictive RLOCs," draft-farinacci-lisp-predictive-rlocs-00, May 6, 2016, 13 pages.
(Continued)

*Primary Examiner* — Oussama Roudani
(74) *Attorney, Agent, or Firm* — Conley Rose, P.C.

(57) ABSTRACT

A method of utilizing a list of predictive paths by a map-server. The method includes receiving the list of predictive paths, storing the list of predictive paths in a memory, receiving, from a first network element, a request for a location of a user device, the request related to transmitting a packet to the user device, and transmitting, to the first network element, a plurality of user locations based on the list of predictive paths, the plurality of user locations identifying where a second user device will transmit the packet when the packet is received by the second user device.

23 Claims, 6 Drawing Sheets

Related U.S. Application Data continuation of application No. 15/584,957, filed on May 2, 2017, now Pat. No. 10,349,333.

(60) Provisional application No. 62/332,639, filed on May 6, 2016.

(51) Int. Cl.
*H04L 45/16* (2022.01)
*H04W 64/00* (2009.01)
*H04L 45/02* (2022.01)

(56) References Cited

U.S. PATENT DOCUMENTS

| | | | |
|---|---|---|---|
| 8,804,746 B2* | 8/2014 | Wu | H04L 61/103 370/396 |
| 9,276,871 B1* | 3/2016 | Freitas | H04L 61/2007 |
| 10,027,546 B1 | 7/2018 | Qin et al. | |
| 10,110,554 B2 | 10/2018 | Yoon et al. | |
| 2012/0214506 A1 | 8/2012 | Skaaksrud et al. | |
| 2012/0314714 A1* | 12/2012 | Hu | H04L 45/50 370/400 |
| 2013/0089018 A1 | 4/2013 | Kim et al. | |
| 2013/0198369 A1 | 8/2013 | Kim et al. | |
| 2013/0243004 A1 | 9/2013 | Hikichi et al. | |
| 2013/0279508 A1 | 10/2013 | Kano | |
| 2014/0297875 A1 | 10/2014 | Cheng et al. | |
| 2014/0301387 A1 | 10/2014 | Subramanian et al. | |
| 2015/0003455 A1 | 1/2015 | Haddad et al. | |
| 2015/0074741 A1 | 3/2015 | Janakiraman et al. | |
| 2015/0156183 A1 | 6/2015 | Beyer et al. | |
| 2015/0263864 A1 | 9/2015 | Yang et al. | |
| 2016/0065531 A1 | 3/2016 | Xiaopu et al. | |
| 2016/0134526 A1 | 5/2016 | Maino et al. | |
| 2016/0173356 A1 | 6/2016 | Jiang et al. | |
| 2017/0026417 A1* | 1/2017 | Ermagan | H04L 63/0272 |
| 2017/0078241 A1 | 3/2017 | Zhang et al. | |
| 2017/0339623 A1 | 11/2017 | Pillay-Esnault | |
| 2018/0039505 A1 | 2/2018 | Lin | |
| 2018/0091471 A1 | 3/2018 | Hooda et al. | |
| 2018/0146414 A1 | 5/2018 | Skaaksrud et al. | |
| 2018/0309659 A1 | 10/2018 | Ko et al. | |

FOREIGN PATENT DOCUMENTS

| | | |
|---|---|---|
| CN | 103166856 A | 6/2013 |
| CN | 103686905 A | 3/2014 |
| EP | 1473890 A2 | 11/2004 |
| JP | 2014512582 A | 5/2014 |
| WO | 2016055125 A1 | 4/2016 |

OTHER PUBLICATIONS

Cabellos, A. et al., "An Architectural Introduction to the Locator/ID Separation Protocol (LISP)," draft-ietf-lisp-introduction-13, Apr. 2, 2015, 27 pages.
Farinacci, D., et al., "LISP Geo-Coordinate Use-Cases," draft-farinacci-lisp-geo-00, Apr. 14, 2016, 6 pages.
Farinacci, D., et al., "LISP Geo-Coordinate Use-Cases," draft-farinacci-lisp-geo-01, Oct. 12, 2016, 7 pages.
Farinacci, D., et al., "LISP Geo-Coordinate Use-Cases," draft-farinacci-lisp-geo-02, Oct. 28, 2016, 10 pages.
Farinacci, D., et al., "LISP Predictive RLOCs," draft-farinacci-lisp-predictive-rlocs-01, Nov. 13, 2016, 13 pages.
Farinacci, D., et al., "LISP Data-Plane Confidentiality," draft-ietf-lisp-crypto-03, Dec. 4, 2015, 17 pages.
Farinacci, D., et al., "LISP Data-Plane Confidentiality," draft-ietf-lisp-crypto-04, May 31, 2016, 18 pages.
Farinacci, D., et al., "LISP Data-Plane Confidentiality," draft-ietf-lisp-crypto-05, Jun. 27, 2016, 18 pages.
Farinacci, D., et al., "LISP Data-Plane Confidentiality," draft-ietf-lisp-crypto-06, Jun. 29, 2016, 18 pages.
Farinacci, D., et al., "LISP Data-Plane Confidentiality," draft-ietf-lisp-crypto-07, Sep. 19, 2016, 19 pages.
Farinacci, D., et al., "LISP Data-Plane Confidentiality," draft-ietf-lisp-crypto-08, Sep. 25, 2016, 19 pages.
Farinacci, D., et al., "LISP Data-Plane Confidentiality," draft-ietf-lisp-crypto-09, Oct. 12, 2016, 21 pages.
Farinacci, D., et al., "LISP Data-Plane Confidentiality," draft-ietf-lisp-crypto-10, Oct. 14, 2016, 21 pages.
Farinacci, D., et al., "LISP Canonical Address Formal (LCAF)," draft-ietf-lisp-lcaf-12, Mar. 14, 2016, 41 pages.
Farinacci, D., et al., "LISP Canonical Address Formal (LCAF)," draft-ietf-lisp-lcaf-13, May 3, 2016, 41 pages.
Farinacci, D., et al., "LISP Canonical Address Formal (LCAF)," draft-ietf-lisp-lcaf-14, Jul. 19, 2016, 41 pages.
Farinacci, D., et al., "LISP Canonical Address Formal (LCAF)," draft-ietf-lisp-lcaf-15, Sep. 19, 2016, 43 pages.
Farinacci, D., et al., "LISP Canonical Address Formal (LCAF)," draft-ietf-lisp-lcaf-16, Oct. 1, 2016, 43 pages.
Farinacci, D., et al., "LISP Canonical Address Formal (LCAF)," draft-ietf-lisp-lcaf-17, Oct. 12, 2016, 43 pages.
Farinacci, D., et al., "LISP Canonical Address Formal (LCAF)," draft-ietf-lisp-lcaf-18, Oct. 14, 2016, 44 pages.
Farinacci, D., et al., "LISP Canonical Address Formal (LCAF)," draft-ietf-lisp-lcaf-19, Oct. 18, 2016, 44 pages.
Farinacci, D., et al., "LISP Canonical Address Formal (LCAF)," draft-ietf-lisp-lcaf-20, Oct. 29, 2016, 44 pages.
Farinacci, D., et al., "LISP Canonical Address Formal (LCAF)," draft-ietf-lisp-lcaf-21, Nov. 16, 2016, 44 pages.
Farinacci, D., et al., "LISP Canonical Address Formal (LCAF)," draft-ietf-lisp-lcaf-22, Nov. 28, 2016, 47 pages.
Maino, F., et al., "LISP-Security (LISP)," draft-ietf-lisp-sec-10, Apr. 13, 2016, 19 pages.
Maino, F., etaL, "LISP-Security (LISP)," draft-ietf-lisp-sec-11, Oct. 3, 2016, 19 pages.
Maino, F., et al., "LISP-Security (LISP)," draft-ietf-lisp-sec-12, Nov. 16, 2016, 22 pages.
Moreno, V., "Signal-Free LISP Multicast," draft-ietf-lisp-signal-free-multicast-01, Apr. 21, 2016, 19 pages.
Moreno, V., "Signal-Free LISP Multicast," draft-ietf-lisp-signal-free-multicast-02, Oct. 17, 2016, 19 pages.
Portoles, M., et al., "LISP L2/L3 EID Mobility Using a Unified Control Plane," draft-portoles-lisp-eid-mobility-00, Apr. 7, 2016, 20 pages.
Bradner, S., et al., "Key words for use in RFCs to Indicate Requirement Levels," RFC 2119, Mar. 1997, 3 pages.
Farinacci, D., et al., "The Locator/IED Separation Protocol (LISP)," RFC 6830, Jan. 2013, 75 pages.
Farinacci, D., "LISP Predictive RLOCs," draft-ietf-lisp-predictive-rlocs-00, Jun. 7, 2017, 13 pages.
Fuller, et al., "Locator/ID Separation Protocol (LISP) Map-Server Interface," RFC 6833, Jan. 2013, 13 pages.
Pillay-Esnault, "Predictive Routing for Mobility," U.S. Appl. No. 62/332,639, filed May 6, 2016, 27 pages.
Farinacci, D., et al., "LISP Predictive RLOCs," draft-farinacci-lisp-predictive-rlocs-00, May 6, 2016, 13 pages.

* cited by examiner

PREDICTIVE ROUTING FOR MOBILITY

CROSS-REFERENCE TO RELATED APPLICATIONS

This application is a continuation of U.S. patent application Ser. No. 16/445,522 filed Jun. 19, 2019, which is a continuation of U.S. patent application Ser. No. 15/584,957, filed on May 2, 2017, entitled "Predictive Routing For Mobility," now U.S. Pat. No. 10,349,333 Issued Jul. 9, 2019, which claims the benefit of U.S. Provisional Application Ser. No. 62/332,639 filed on May 6, 2016, and entitled "Predictive Routing For Mobility," which applications are incorporated herein by reference.

TECHNICAL FIELD

The present application relates to a system and method for communications, and, in particular, to a method, apparatus, and system for predictive routing for mobility.

BACKGROUND

Internet protocol (IP) address semantics represent both the location and the identity (ID) of a node. The IP address is often used to identify a session and is expected to be fixed for the session duration. However, mobile nodes may have a change of address when they relocate or change network access (e.g., from Wireless Fidelity (WiFi) to cellular). Therefore, it is difficult to implement mobility of nodes and keep a session continuity with remote sites when the nodes rely on IP addresses for sessions. Some IP solutions, such as Mobile Internet Protocol version 4 (IPv4), Mobile Internet Protocol version 6 (IPv6), Proxy mobile IP, Distributed Mobility Management (DMM), General Packet Radio Service (GPRS) Tunneling Protocol (GTP) work around this limitation using the mobility anchor concept to keep the IP address fixed and rely on re-forwarding of traffic. These solutions usually introduce latency due to triangular routing of the packets to the anchor and then the final destination. Other solutions use the identity and location separation concept and a map server to determine where to forward the traffic, such as in Locator/ID Separation Protocol (LISP). For example, LISP relies on Route Locator (RLOC) address to identify the end point address and an End Point Identifier (EID) to represent the ID to be used in the session. Because the ID is fixed during the session, the movement and change of IP address is transparent to the session and above applications.

Most existing solutions treat the mobility of nodes as something that is unpredictable and random. Therefore, existing solutions often offer sub-optimal routing, usually with a re-routing through a mobility anchor or using similar concepts or by introducing latency when mapping servers update the RLOC to reflect a new location. As such, the latency requirements for new communications standards such as the $5^{th}$ Generation mobile standard (5G), which may be five milliseconds (ms) or less, will be difficult for the existing solutions to meet.

SUMMARY

According to one aspect of the present disclosure, there is provided a method of utilizing a list of predictive paths by a map-server. The method includes receiving the list of predictive paths, storing the list of predictive paths in a memory, receiving, from a first network element, a request for a location of a user device, the request related to transmitting a packet to the user device, and transmitting, to the first network element, a plurality of user locations based on the list of predictive paths, the plurality of user locations identifying where a second user device will transmit the packet when the packet is received by the second user device.

Optionally, in any of the preceding aspects, another implementation of the aspect provides that the list of predictive paths comprises a list of Route Locator Addresses (RLOCs).

Optionally, in any of the preceding aspects, another implementation of the aspect provides that the list of predictive paths is received from the user device.

Optionally, in any of the preceding aspects, another implementation of the aspect provides that the list of predictive paths is received from a third party entity.

Optionally, in any of the preceding aspects, another implementation of the aspect provides that the first network element is an ingress tunnel router (ITR).

Optionally, in any of the preceding aspects, another implementation of the aspect provides that the second network element is a Re-encapsulating Tunnel Router (RTR) implemented on a Packet Data Network Gateway (P-GW).

Optionally, in any of the preceding aspects, another implementation of the aspect provides that the second network element is an ingress/egress router (xTR) implemented on a Service Gateway (S-GW).

Optionally, in any of the preceding aspects, another implementation of the aspect provides that the list of predictive paths is stored using a Locator/Identification Separation Protocol (LISP) canonical address format (LCAF) encoded replication list entry type.

Optionally, in any of the preceding aspects, another implementation of the aspect provides that the list of predictive paths is stored by a map-server (MS) along with an End Point Identifier Address (EID) and current RLOC of the user device.

Optionally, in any of the preceding aspects, another implementation of the aspect provides receiving, from the second network element, a request for a location of a Locator/Identification Separation Protocol (LISP) site storing the packet prior to receiving the request for the location of the user device.

According to one aspect of the present disclosure, there is provided a method of utilizing a list of predictive paths by a router in a network. The method includes receiving a request for a packet from a user device, requesting a location of the packet from a first network element, requesting the packet from a second network element following receipt of the location from the first network element, receiving the packet and a plurality of locations from the second network element, wherein the plurality of locations are based on the list of predictive paths stored at the first network element, and replicating the packet and sending a copy to each of the plurality of locations.

Optionally, in any of the preceding aspects, another implementation of the aspect provides that the list of predictive paths comprises a list of Route Locator Addresses (RLOCs).

Optionally, in any of the preceding aspects, another implementation of the aspect provides that the router is a Re-encapsulating Tunnel Router (RTR) implemented on a Packet Data Network Gateway (P-GW), wherein the first network element is a map-server (MS), and wherein the network is an identification-oriented network.

Optionally, in any of the preceding aspects, another implementation of the aspect provides that the second network element is an ingress tunnel router (ITR) at a Locator/Identification Separation Protocol (LISP) site.

Optionally, in any of the preceding aspects, another implementation of the aspect provides that one or more of the plurality of locations represent an ingress/egress router (xTR) implemented on a Service Gateway (S-GW).

According to one aspect of the present disclosure, there is provided a user device coupled to a server having a routing table in an identification-oriented network. The user device includes a memory, a processor coupled to the memory and configured to determine a list of Route Locator Addresses (RLOCs), and a transmitter coupled to the processor and configured to transmit the list of RLOCs to the routing table for storage by the routing table. The list of RLOCs are utilized in routing packets through the identification-oriented network.

Optionally, in any of the preceding aspects, another implementation of the aspect provides that the server is a map-server (MS), and wherein the list of RLOCs are determined by the user device using at least one of pattern recognition and geolocation.

Optionally, in any of the preceding aspects, another implementation of the aspect provides that the list of RLOCs is determined by one of the user device and a third party entity based on a direction of travel of at least one of the user device and a vehicle transporting the user device.

Optionally, in any of the preceding aspects, another implementation of the aspect provides that a packet requested by the user device is available to the user device at two different locations based on the list of RLOCs.

Optionally, in any of the preceding aspects, another implementation of the aspect provides that the list of RLOCs is transmitted to the routing table along with an End Point Identifier Address (EID) and current RLOC of the user device.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, and may be modified within the scope of the appended claims along with their full scope of equivalents.

Implementing the mobility of nodes, such as a plurality of user devices, presents various issues such as, for example, maintaining session continuity for the plurality of user devices and achieving the latency requirements for the new communications standards. A system and protocol that uses predictive routing are disclosed herein to address the mobility issues discussed above. Despite the existing solutions treating the mobility of nodes as unpredictable and random, patterns may be deduced and simplifications may be achieved by studying real life situations in which the user devices (e.g., mobile phones, tablets, etc.) are used. Based on those patterns and/or simplifications, a list of paths (e.g., RLOCs in LISP) that can be predicted with high probability (e.g., using geolocation, signaling for handover in a user equipment (UE), etc.) is generated by a user device or a third-party. The list of paths is then uploaded to a routing or forwarding structure (e.g., a map-server in LISP) in advance. When the user device later requests a packet, a network element (e.g., Packet Data Network Gateway (P-GW) or a LISP site) replicates the packet received from a site and sends one copy of the packet based on the actual path (i.e., the current path) or to the actual RLOC of the user device (e.g., to one Service Gateway (S-GW)) and another copy based on a predictive path or to a predictive RLOC (e.g., to another S-GW) based on the list of RLOCs stored in the map-server. By doing so, session continuity is maintained for the user device and the latency requirements for the new communications standards can be met. The principle is to send packets to possible locations where the mobile user device may be found. The solution is a tradeoff between use of bandwidth versus ultralow latency as the packets are likely to arrive at the new locations ahead of the mobile device itself therefore reducing the latency and ensuring almost zero packet loss.

Figure 1:
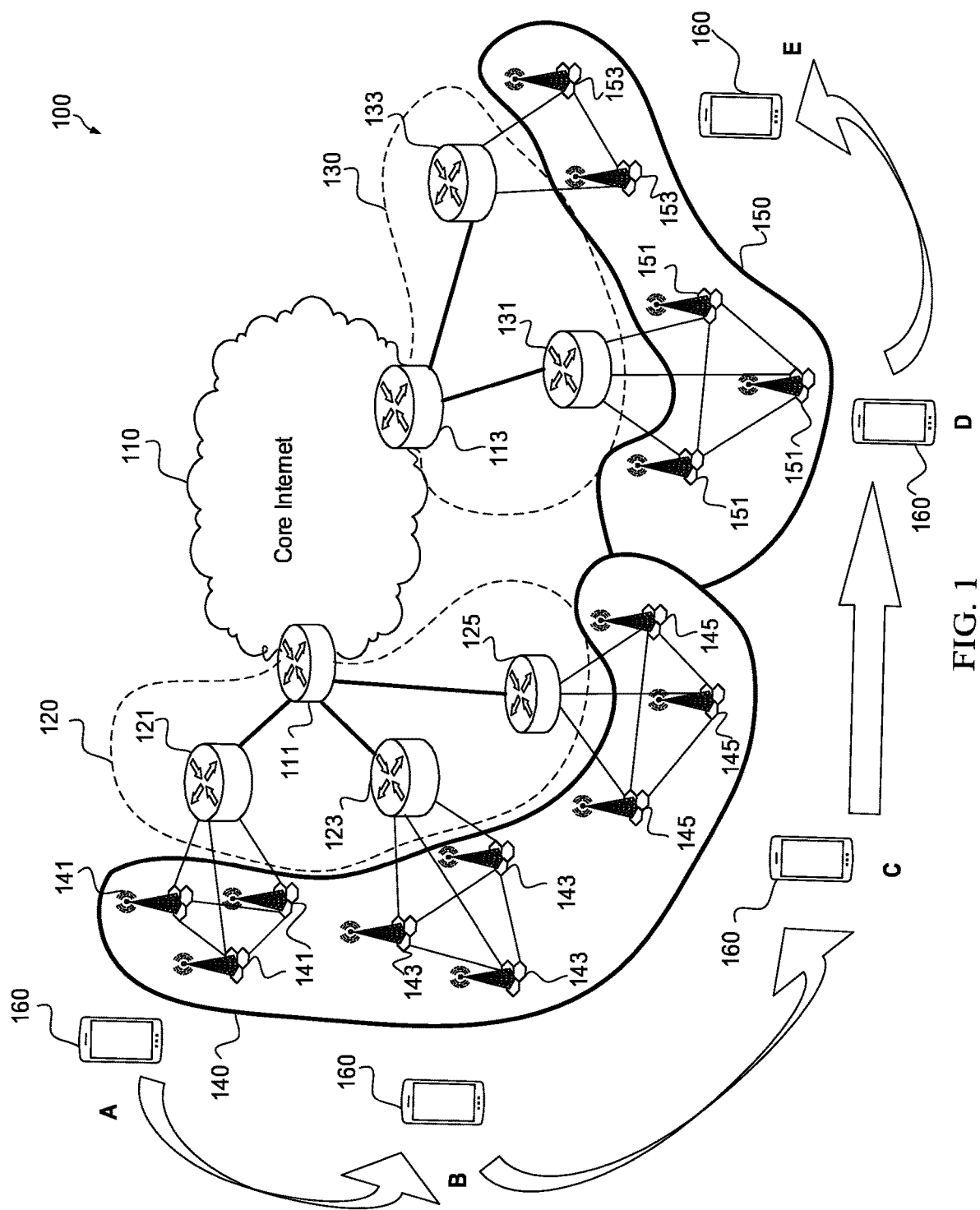
FIG. 1 illustrates a telecommunications network.

FIG. 1 illustrates a telecommunications network 100. As shown, the telecommunications network 100 includes a first Evolved Universal Terrestrial Radio Access Network (E-UTRAN) 140 overlapping a second E-UTRAN 150. While the first and second E-UTRANs 140 and 150 are illustrated for purposes of discussion, the telecommunications network 100 may contain any number of E-UTRANs in practical applications. The first E-UTRAN 140 includes a first plurality of base stations 141, a second plurality of base stations 143, and a third plurality of base stations 145. The second E-UTRAN 150 includes a fourth plurality of base stations 151 and a fifth plurality of base stations 153. Each of the base stations in the first through fifth plurality of base stations 141, 143, 145, 151, and 153 may be a Node B, an evolved Node B (eNB), a base transceiver station (BTS), or other similar element.

The base stations in the first plurality of base stations 141 are intra-connected using an X2 interface and inter-connected with a first S-GW 121 using an S1 interface. The base stations in the second plurality of base stations 143 are intra-connected using another X2 interface and inter-connected with a second S-GW 123 using another S1 interface. The base stations in the third plurality of base stations 145 are intra-connected using another X2 interface and interconnected with a third S-GW 125 using another S1 interface. The base stations in the fourth plurality of base stations 151 are intra-connected using another X2 interface and inter-connected with a fourth S-GW 131 using another S1 interface. Finally, the base stations in the fifth plurality of base stations 153 are intra-connected using another X2 interface and inter-connected with a fifth S-GW 133 using another S1 interface.

The first E-UTRAN 140 is serviced by a first Evolved Packet Core (EPC) 120. The first EPC 120 contains the first, second, and third S-GWs 121, 123, and 125, respectively. The second E-UTRAN 150 is serviced by a second EPC 130. The second EPC 130 contains the fourth and fifth S-GWs 131 and 133, respectively. The first, second, and third S-GWs 121, 123, and 125 within the first EPC 120 communicate with a first P-GW 111 using an S5/S8 interface. The fourth and fifth S-GWs 131 and 133 within the EPC 130 communicate with a second P-GW 113 using another S5/S8 interface. The first P-GW 111 is disposed at one interface between the first EPC 120 and the Core Internet 110. The second P-GW 113 is disposed at another interface between the second EPC 130 and the Core Internet 110.

The telecommunications network 100 further includes a user device 160. While the user device 160 is depicted as a mobile phone in FIG. 1, the user device 160 may also be a tablet computer, a laptop computer, a personal digital assistant, and so on. As shown in FIG. 1, the user device 160 makes a journey from a location A to a location E as designated by the arrows. The user device 160 is serviced by the first, second, and third plurality of base stations 141, 143, and 145 at the locations A, B, and C, respectively, and by the fourth and fifth plurality of base stations 151 and 153 at the locations D and E, respectively.

As the user device 160 travels, the user device 160 will be serviced by the first P-GW 111 at the locations A, B, and C and by the second P-GW 113 at the locations D and E. In addition, the user device 160 switches from utilizing the first E-UTRAN 140 to the second E-UTRAN 150. In order to continue accessing the Core Internet 110 when transiting from the E-UTRAN 140 to the E-UTRAN 150, the user device 160 needs to obtain a new IP address. During this transition, session continuity may be lost. The latency requirements of the new communications standards may not be achievable if the session continuity is lost.

Figure 2:
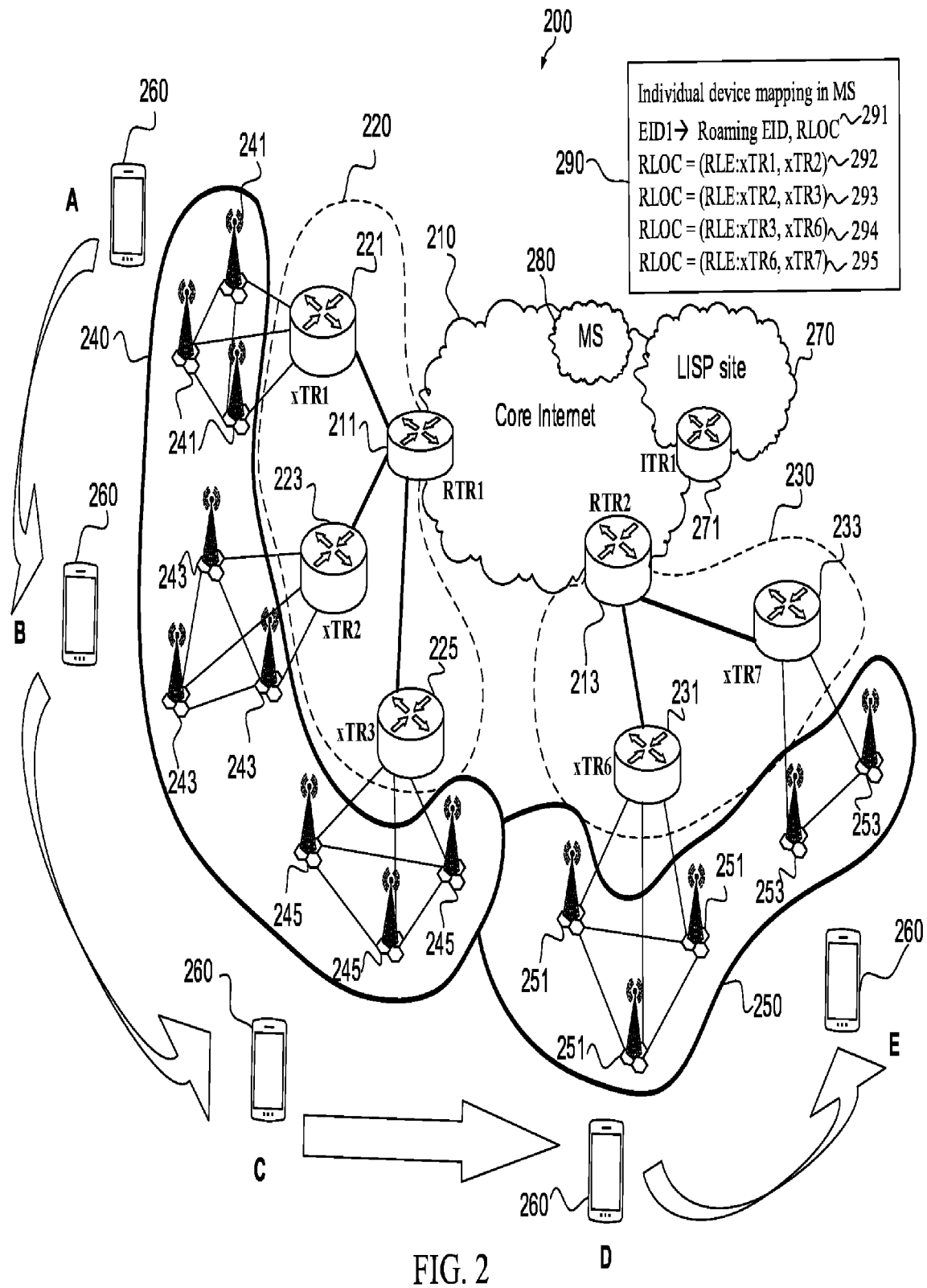
FIG. 2 illustrates a LISP network according to an embodiment of the present disclosure.

FIG. 2 illustrates a LISP network 200 in accordance with one embodiment of the present disclosure. The LISP network 200 of FIG. 2 is similar to the telecommunications network 100 of FIG. 1. However, unlike the telecommunications network 100 of FIG. 1, the LISP network 200 of FIG. 2 includes network elements having additional functionality, as will be more fully explained below.

As shown in FIG. 2, the LISP network 200 includes a first E-UTRAN 240 overlapping a second E-UTRAN 250. The first and second E-UTRANs 240 and 250 of FIG. 2 are similar to the first and second E-UTRANs 140 and 150 of FIG. 1. While the first and second E-UTRANs 240 and 250 are illustrated for purposes of discussion, the LISP network 200 may contain any number of E-UTRANs in practical applications. The first E-UTRAN 240 includes a first plurality of base stations 241, a second plurality of base stations 243, and a third plurality of base stations 245. The second E-UTRAN 250 includes a fourth plurality of base stations 251 and a fifth plurality of base stations 253. In an embodiment, each of the base stations in the first through fifth plurality of base stations 241, 243, 245, 251, and 253 may be a Node B, an eNB, a BTS, or other similar element. The first through fifth plurality of base stations 241, 243, 245, 251, and 253 of FIG. 2 are similar to the first to fifth plurality of base stations 141, 143, 145, 151, and 153 of FIG. 1.

In an embodiment, the base stations in the first plurality of base stations 241 are intra-connected using an X2 interface and inter-connected with a first S-GW 221 using an S1 interface. In an embodiment, the base stations in the second plurality of base stations 243 are intra-connected using another X2 interface and inter-connected with a second S-GW 223 using another S1 interface. In an embodiment, the base stations in the third plurality of base stations 245 are intra-connected using another X2 interface and inter-connected with a third S-GW 225 using yet another S1 interface. In an embodiment, the base stations in the fourth plurality of base stations 251 are intra-connected using another X2 interface and inter-connected with a fourth S-GW 231 using another S1 interface. Finally, in an embodiment the base stations in the fifth plurality of base stations 253 are intra-connected using another X2 interface and inter-connected with a fifth S-GW 233 using another S1 interface. In an embodiment, an interface other than an X2 interface may be used to interconnect the various base stations. In an embodiment, an interface other than an S1 interface may be used to couple the various base stations to the first through fifth S-GWs 221, 223, 225, 231, and 233.

The first E-UTRAN 240 is serviced by a first EPC 220 containing first, second, and third S-GWs 221, 223, and 225, respectively. The second E-UTRAN 250 is serviced by a second EPC 230 containing fourth and fifth S-GWs 231 and 233, respectively. The first through fifth S-GWs 221, 223, 225, 231, and 233 of FIG. 2 are similar to the first through fifth S-GWs 121, 123, 125, 131, and 133 of FIG. 1. The first and second EPCs 220 and 230 of FIG. 2 are similar to the first and second EPCs 120 and 130 of FIG. 1.

In an embodiment, the first through third S-GWs 221, 223, and 225 within the first EPC 220 communicate with a first P-GW 211 using an S5/S8 interface. In an embodiment, the fourth and fifth S-GWs 231 and 233 within the second EPC 230 communicate with a second P-GW 213 using an S5/S8 interface. In an embodiment, an interface other than the S5/S8 interface may be used to couple the first through fifth S-GWs 221, 223, 225, 231, and 233 to the first and second P-GWs 211 and 213.

The first P-GW 211 is disposed at one interface between the first EPC 220 and the Core Internet 210, and the second P-GW 213 is disposed at another interface between the second EPC 230 and the Core Internet 210. The first and second P-GWs 211 and 213 of FIG. 2 are similar to the first and second P-GWs 111 and 113 of FIG. 1. The Core Internet 210 of FIG. 2 is similar to the Core Internet 110 of FIG. 1.

The LISP network 200 further includes a user device 260. The user device 260 of FIG. 2 is similar to the user device 160 of FIG. 1. While the user device 260 is depicted as a mobile phone in FIG. 2, the user device 260 may also be a tablet computer, a laptop computer, a personal digital assistant, and so on.

As shown in FIG. 2, the user device 260 makes a journey from a location A to a location E as designated by the arrows. Along this path, the user device 260 is serviced by the first through third plurality of base stations 241, 243, and 245 at the locations A, B, and C, respectively, and by the fourth and fifth plurality of base stations 251, and 253 at the locations D and E, respectively. Therefore, the user device 260 will be serviced by the first P-GW 211 at the locations A, B, and C and by the second P-GW 213 at the locations D and E. As shown, the user device 260 will switch from being serviced by the first E-UTRAN 240 to being serviced by the second E-UTRAN 250 between the location C and the location D.

The LISP network 200 includes a plurality of network elements (e.g., LISP site devices) identifiable by their location and disposed at an edge of the LISP network 200. For example, one of the network elements is an edge network element 271 for a LISP site 270 (which has a LISP infrastructure and will be discussed more fully below), another network element is the first P-GW 211 which is disposed between the Core Internet 210 and the first EPC 220, and another network element is the second P-GW 213 disposed between the Core Internet 210 and the second EPC 230 of FIG. 2. While not shown in FIG. 2, the network elements (a.k.a., LISP site devices) are interconnected by one or more IP routers.

The network elements in FIG. 2 may be, for example, an ingress tunnel router (ITR), an egress tunnel router (ETR), and/or a Re-encapsulating Tunnel Router (RTR). The ITR is an edge network element responsible for mapping a destination ID to the destination RLOC. The ITR encapsulates packets and forwards them to the other LISP sites 270, or may simply forward the packets if the destination uses traditional IP. The ITR does not set up any tunnels or perform similar functionality. Rather, the ITR performs only mapping and encapsulation functions. Those skilled in the art will appreciate upon review of this disclosure that any network element looking for the predictive route of, for example, the user device may be utilized in place of the ITR.

The ETR is an edge network element that receives packets from the core network (which uses IP), decapsulates (a.k.a., unencapsulates) the LISP packets, and forwards the LISP packets to the user device 260 associated with the local destination EID. The RTR is a router that implements the re-encapsulating tunnel function detailed in the Request for Comments (RFC) 6830 entitled "The Locator/ID Separation Protocol (LISP)," January 2013, which is incorporated by reference. A LISP RTR performs packet re-routing by changing ETR and ITR functions by, for example, removing a LISP header of an ingress packet and then prepending a new LISP header to an egress packet. Those skilled in the art will appreciate upon review of this disclosure that any network element configured to modify a destination of a packet depending on a probable location of the destination or replicate packets may be utilized in place of the RTR.

In many cases, a network element has a combination of both ingress and egress functions and, as such, may be referred to as an xTR. xTR refers to a router that is the tunnel endpoint and may be used synonymously with the term tunnel router. As shown in FIG. 2, the ITR, ETR, xTR, and/or RTR functionality overlays the underlying components in the LISP network 200 of FIG. 2. In an embodiment, xTR1, xTR2, xTR3, xTR6 and xTR7 are associated with the first through fifth S-GWs 221, 223, 225, 231 and 233 of FIG. 2, respectively. In another embodiment, RTR1, RTR2, and ITR1 are associated with the first P-GW 211, the second P-GW 213, and the edge device 271, respectively.

The LISP network 200 of FIG. 2 also includes LISP infrastructure network elements, such as a map-server and a map-resolver collectively represented in FIG. 2 by MS 280. A map-server is a device that registers ETRs and their local EIDs. A map-resolver is a device that responds to queries sent by ITRs to resolve the EID-RLOC mapping. The MS 280 may operate on a server or other network or computing device (not shown). The MS 280 may be centralized within the LISP network 200. The MS 280 advertises/aggregates the registered EID into a LISP mapping system. In an embodiment, all LISP sites 270 are able to use the LISP mapping system.

The LISP network 200 utilizes a name space handling that includes EID addresses and RLOC addresses. In an embodiment, the EID addresses are in an IP format and are identifiers only. Each EID address (e.g., EID1, EID2, etc.) identifies a particular user device, such as the user device 260. By way of example, the EID 291 in FIG. 2 is an identifier assigned to the user device 260.

The LISP network 200 also utilizes a list of predictive paths. In the LISP network 200 context, the list of predictive paths comprises a list of RLOCs 290 containing RLOCs 292, 293, 294, and 295 as shown in FIG. 2. The RLOCs 292, 293, 294, and 295 are the IP addresses of various routers and nodes in the LISP network 200. The RLOCs 292, 293, 294, and 295 are routable addresses and reachability is through the usual IP protocols, routing tables, and so on. The RLOCs 292, 293, 294, and 295 are location-based. In an embodiment, the list of RLOCs 290 is uploaded by the user device 260 to the MS 280. In an embodiment, the list of RLOCs 290 may be uploaded by a third party. In an embodiment, the list of RLOCs 290 may be uploaded along with the EID1 291 of the user device 260, the current or actual RLOC of the user device 260, and other packet routing information.

The RLOCs 292, 293, 294, and 295 contained in the list of RLOCs 290 are able to be predicted with high probability. In an embodiment, as used herein high probability refers to a probability in the range of about 50% up to and including 100%. In an embodiment, high probability refers to a probability greater than about 40%. The list of RLOCs 290 may be determined using a variety of different techniques. For example, the list of RLOCs 290 may be predicted using geolocation (e.g., using the global positioning system (GPS) capability of the user device 260, using a plurality of cell towers to triangulate location, etc.). The list of predictive RLOCs 290 may also be formulated based on recognized patterns (e.g., the user always goes to work at 8 a.m. using a specific route on weekdays, etc.).

As shown in FIG. 2, the MS 280 stores the list of predictive RLOCs 290 received from the user device 260. In an embodiment, the user device 260 registers the predictive RLOCs 292, 293, 294, and 295 into the MS 280 using a LISP canonical address format (LCAF) encoded replication list entry (RLE) type, which is described in Internet Engineering Task Force (IETF) document draft-ietf-lisp-lcaf-20, "LISP Canonical Address Format (LCAF)," published Oct. 29, 2016 by D. Farinacci, et al., which is incorporated herein by reference. In an embodiment, a third party device may register the predictive RLOCs 292, 293, 294, and 295.

In an embodiment, the EID1 291 of the user device 260 stays the same as the user device 260 moves from one location to the next. By way of example, assume that the MS 280 initially maps EID1 291 of the user device 260 at the location C with predictive RLOC 293, which contains xTR3. As the user device 260 associated with the EID1 291 moves from the location C to the location D, the user device 260 may no longer be served by the LISP xTR3 included in the third S-GW 225 of the LISP network 200 of FIG. 2 and may begin to be served by the LISP xTR6 included in the fourth S-GW 231 of the LISP network 200 of FIG. 2. As shown in FIG. 2, xTR6 is included within RLOC 294. Therefore, the EID 291 is mapped by the MS 280 to the predictive RLOC 294 at the location D. Hence, the EID 291 of the user device 260 stays the same as the user device 260 moves from one location to the next even though it changes its RLOCs.

In an embodiment, the EID 291 of the user device 260 is associated with a roaming EID and a particular RLOC, such as RLOC 292, RLOC 293, RLOC 294, or RLOC 295 during the individual user device 260 mapping in the MS 280. In addition, each of the predictive RLOCs 292, 293, 294, and 295 is represented using RLE, which is described in IETF document draft-ietf-lisp-signal-free-multicast-02, "Signal Free LISP Signaling," published Oct. 17, 2016, by D. Farinacci, et al., which is incorporated herein by reference. For example, the predictive RLOC 292 in the list of predictive RLOCs 290 indicates that the current device servicing the user device 260 is xTR1 (i.e., included in the first S-GW 221) and that the predicted next device that will service the user device 260 will be xTR2 (i.e., included in the second S-GW 223). While two entries are shown in each of the predictive RLOCs 292, 293, 294, and 295, it should be recognized that additional devices may be included in the predictive RLOCs 292, 293, 294, and 295. For example, the predictive RLOC 292 in the list of predictive RLOCs 290 could include xTR1, xTR2, xTR3, and so on in other embodiments.

Each predictive RLOC 292, 293, 294, and 295 in the list of RLOCs 290 includes the current network element (e.g., router, gateway, etc.) serving the user device 260 followed by the one or more network elements (e.g., routers, gateways, etc.) that are predicted to service the user device 260 in the future as the user device 260 moves from the locations A through E. For example, RLOC 292 includes the current network element xTR1 servicing the user device 260 followed by the next network element xTR2 predicted to service the user device 260.

When there is a packet to be forwarded to the EID 291 associated with the user device 260, the network elements (e.g., routers, gateways, etc.) such as the first and second P-GWs 211 and 213 in the proximity of the user device 260 will replicate the packet and send the replicated packet to the network elements (e.g., routers, gateways, etc.) such as the first through fifth S-GWs 221, 223, 225, 231, and 233. In an embodiment, the ITR1 in the edge device 271 may perform the replication of the packet. The network elements, such as the first through fifth S-GWs 221, 223, 225, 231, and 233 will be able to reach the user device 260 according to the predictive RLOCs 292, 293, 294, and 295 stored in the MS 280.

The packet will be transmitted by delivering one copy of the packet to the network element where the user device 260 was when the packet request was sent (e.g., the first through fifth S-GWs 221, 223, 225, 231, and 233) and delivering another copy of the packet to the network element where the user device 260 is predicted to be next (e.g., the first through fifth S-GWs 221, 223, 225, 231, and 233) based on the list of predictive RLOCs 290 stored in the MS 280.

As shown in FIG. 2, the position of the user device 260 associated with the EID1 291 changes during travel from the location A to the location E. The user device 260 registers its EID1 291 with the first through fifth plurality of base stations 241, 243, 245, 251, and 253 or first and second E-UTRANs 240 and 250. Therefore, the RTRs included in the network elements (e.g., P-GWs 211 and 213) or the xTRs included in the network elements (e.g., S-GWs 221, 223, 225, 231, and 233) that are attempting to send packets to the user device 260 are able to start sending packets ahead of the current position of the user device 260, or stop sending packets if the user device 260 has passed the service area of the RTR or xTR. Moreover, the ITR and/or RTR are able to make adjustments to only send packets to the relevant xTRs (e.g., the xTRs able to reach the user device 260). As such, session continuity is maintained and the latency issues noted above are avoided.

An example embodiment of the present disclosure is implemented using the architecture of FIG. 2. To begin, the user device 260 associated with EID1 291 registers the list of predictive RLOCs 290 with the MS 280. Thereafter, the user device 260 initiates a communication session or connection with a host or other device. By way of example, the user device 260 may initiate the communication session or connection with the host or other network element by requesting a packet or a series of packets. When the user device 260 requests a packet, the first P-GW 211 including RTR1 contacts the MS 280 to find out where the requested packet or host storing the packet resides. The MS 280 determines the location of the desired packet or host storing the packet and notifies the first P-GW 211 including the RTR1 of the location. Assuming that the requested packet or host is located at the LISP site 270 associated with the edge device 271 including the ITR1, the first P-GW 211 including the RTR1 forwards the request for the data packet to the LISP site 270 associated with the edge network element 271 including the ITR1.

Thereafter, the LISP site 270 associated with the edge network element 271 including the ITR1 contacts the MS 280 to determine where to send the requested packet. The MS 280 consults the list of predictive RLOCs 290 and provides routing information for the requested packet to the LISP site 270 associated with the edge network element 271 including the ITR1. The LISP site 270 associated with the edge network element 271 including the ITR1 then transmits the requested packet based on the information received. For example, if the information indicated that the user device 260 associated with EID1 291 is in the coverage area corresponding to the P-GW 211 including the RTR1, then the packet is sent there.

Once the packet is received, the RTR1 associated with first P-GW 211 duplicates the packet and transmits the packet according to the information received from the MS 280, which was based upon the list of predictive RLOCs 290. If the information indicated that the user device 260 associated with EID1 291 is likely being serviced by the first S-GW 221 including xTR1 and the second S-GW 223 including xTR2 (i.e., the information identifies RLOC 292, which contains the RLE: xTR1, xTR2), the first P-GW 211 including RTR1 sends one copy of the data packet to the first S-GW 221 including xTR1 and another copy of the data packet to the second S-GW 223 including xTR2. As such, the data packet should be received by the user device 260 associated with EID1 291 at the location B or the location C.

Figure 3:
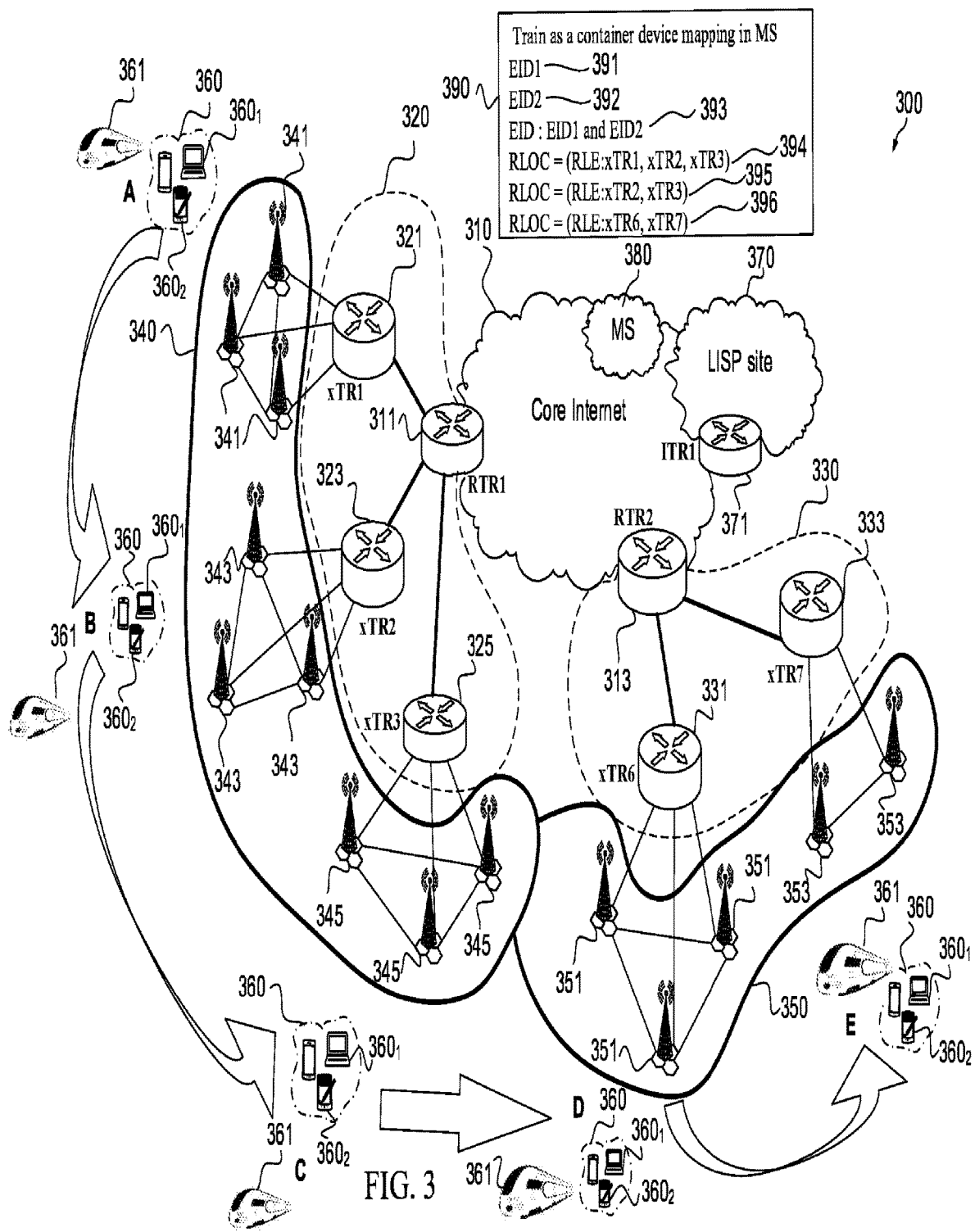
FIG. 3 illustrates a LISP network according to another embodiment of the present disclosure.

FIG. 3 illustrates a LISP network 300 according to one embodiment of the disclosure. The LISP network 300 of FIG. 3 is similar to the LISP network 200 of FIG. 2. As shown, the LISP network 300 includes a first E-UTRAN 340 overlapping a second E-UTRAN 350. The first and second E-UTRANs 340 and 350 of FIG. 3 are similar to the first and second E-UTRANs 240 and 250 of FIG. 2. While the first and second E-UTRANs 340 and 350 are illustrated for purposes of discussion, the LISP network 300 may contain any number of E-UTRANs in practical applications. The first E-UTRAN 340 includes a first plurality of base stations 341, a second plurality of base stations 343, and a third plurality of base stations 345. The second E-UTRAN 350 includes a fourth plurality of base stations 351 and a fifth plurality of base stations 353. In an embodiment, each of the base stations in the first through fifth plurality of base stations 341, 343, 345, 351, and 353 may be a Node B, an eNB, a BTS, or similar element.

The first through fifth plurality of base stations 341, 343, 345, 351, and 353 of FIG. 3 are similar to the first through fifth plurality of base stations 241, 243, 245, 251, and 253 of FIG. 2. The base stations in the first plurality of base stations 341 are intra-connected using an X2 interface and interconnected with a first S-GW 321 using an S1 interface. The base stations in the second plurality of base stations 343 are intra-connected using another X2 interface and inter-connected with a second S-GW 323 using another S1 interface. The base stations in the third plurality of base stations 345 are intra-connected using another X2 interface and interconnected with a third S-GW 325 using another S1 interface. The base stations in the fourth plurality of base stations 351 are intra-connected using another X2 interface and interconnected with a fourth S-GW 331 using another S1 interface. Finally, the base stations in the fifth plurality of base stations 353 are intra-connected using another X2 interface and inter-connected with a fifth S-GW 333 using another S1 interface. In an embodiment, an interface other than an X2 interface may be used to interconnect the various base stations. In an embodiment, an interface other than an S1 interface may be used to couple the various base stations to the first through fifth S-GWs 321, 323, 325, 331, and 333.

The first E-UTRAN 340 is serviced by a first EPC 320 containing a first, second, and third S-GWs 321, 323, and 325, respectively. The second E-UTRAN 350 is serviced by a second EPC 330 containing a fourth and fifth S-GWs 331 and 333, respectively. The first through fifth S-GWs 321, 323, 325, 331, and 333 of FIG. 3 are similar to the first through fifth S-GWs 221, 223, 225, 231, and 233 of FIG. 2. The first and second EPCs 320 and 330 of FIG. 3 are similar to the first and second EPCs 220 and 230 of FIG. 2.

The first through third S-GWs 321, 323, and 325 within the EPC 320 communicate with a first P-GW 311 using S5/S8 interface. The fourth and fifth S-GWs 331 and 333 within the EPC 330 communicate with a second P-GW 313 using S5/S8 interface. In an embodiment, an interface other than the S5/S8 interface may be used to couple the S-GWs 321, 323, 325, 331, and 333 to the P-GWs 311 and 313.

The first P-GW 311 is disposed at the interface between the first EPC 320 and a Core Internet 310, and the second P-GW 313 is disposed at the interface between the second EPC 330 and the Core Internet 310. The first and second P-GWs 311 and 313 of FIG. 3 are similar to the first and second P-GWs 211 and 213 of FIG. 2. The Core Internet 310 of FIG. 3 is similar to the Core Internet 210 of FIG. 2.

The LISP network 300 further includes a plurality of user devices 360 in a vehicle 361 such as, for example, a train, a bus, a subway car, an airplane, and so on. The user devices in the plurality of user devices 360 are similar to the user device 260 of FIG. 2. In an embodiment, the user devices in the plurality of user devices 360 may be a mobile phone, a tablet computer, a laptop computer, a personal digital assistant, and so on.

As shown in FIG. 3, the vehicle 361 containing the plurality of user devices 360 makes a journey from a location A to a location E as designated by the arrows. Along the path, the plurality of user devices 360 in the vehicle 361 are serviced by the plurality of first, second, and third base stations 341, 343, and 345 at the locations A, B, and C, and by the fourth and fifth plurality of base stations 351 and 353 at the locations D, and E, respectively. Therefore, the plurality of user devices 360 will be serviced by the fist P-GW 311 at the locations A, B, and C and by the second P-GW 313 at the locations D and E. As the plurality of user devices 360 collectively travel within the vehicle 361, the plurality of user devices 360 will switch from being serviced by the first E-UTRAN 340 to being serviced by the second E-UTRAN 350 between the location C and the location D.

The LISP network 300 includes a plurality of LISP site devices identifiable by their location and disposed at an edge of the LISP network 300. For example, one of the LISP site devices is an edge device 371 for a LISP site 370, another LISP site device is the first P-GW 311 which is disposed between the Core Internet 310 and the first EPC 320, and another LISP site device is the second P-GW 313 disposed between the Core Internet 310 and the second EPC 330 of FIG. 3. While not shown in FIG. 3, the LISP site devices are interconnected by one or more IP routers.

The LISP site devices 370 in FIG. 3 may be, for example, an ITR, an ETR, and/or an RTR, which are similar to the LISP site devices in FIG. 2. As shown in FIG. 3, the ITR, ETR, xTR, and/or RTR functionality overlays the underlying components in the LISP network 300 of FIG. 3. In an embodiment, xTR1, xTR2, xTR3, xTR6 and xTR7 are associated with the first through fifth S-GWs 321, 323, 325, 331 and 333 of FIG. 3, respectively. In another embodiment, RTR1, RTR2, and ITR1 are associated with the first P-GW 311, the second P-GW 313, and the edge device 371, respectively.

The LISP network 300 of FIG. 3 also includes LISP infrastructure devices, such as a MS 380. The MS 380 of FIG. 3 is similar to the MS 280 of FIG. 2. Similar to the LISP network 200 in FIG. 2, the LISP network 300 in the FIG. 3 utilizes the name space handling that includes EID addresses and RLOC addresses. In an embodiment, the EID addresses are in an IP format and are identifiers only. Each EID address (e.g., EID1, EID2, etc.) identifies a user device in the plurality of user devices 360 such as, for example, a mobile phone, tablet, other mobile communications device. By way of example, an EID1 391 in FIG. 3 is an identifier assigned to a first user device $360_1$ of the plurality of user devices 360 and an EID2 392 in FIG. 3 is an identifier assigned to a second user device 3602 of the plurality of user devices 360. The RLOC addresses are the IP addresses of various routers and nodes in the LISP network 300. The RLOC addresses are routable addresses and reachability is through the usual IP protocols, routing tables, and so on. The RLOC addresses are location-based.

As shown in FIG. 3, a list of predictive RLOCs 390 is stored in the MS 380. The list of predictive RLOCs 390 is similar to the list of predictive RLOCs 290 in FIG. 2 except that the list of predictive RLOCs 390 contains more EIDs, as will be more fully explained below. In an embodiment, the list of predictive RLOCs 390 is uploaded to the MS 380 by a third-party. For example, when the vehicle 361 is a train the list of predictive RLOCs 390 is provided by the train company, when the vehicle 361 is a plane the list of predictive RLOCs 390 is provided by the airline, and when the vehicle 361 is a bus the list of predictive RLOCs is provided by the bus company.

The predictive RLOCs 394, 395, and 396 in the list of predictive RLOCs 390 are able to be predicted with high probability. The list of predictive RLOCs 390 may be determined using a variety of different techniques. For example, the list of predictive RLOCs 390 may be predicted using geolocation (e.g., using the GPS capability of the vehicle 361, using a plurality of cell towers to triangulate location, etc.). In the case of geolocation, probability may be almost 100%. In an embodiment, the list of paths that can be predicted with high probability is based on the user device being disposed within the range of, and able to connect to, the air interface. The list of predictive RLOCs 390 may also be formulated based on recognized patterns (e.g., the vehicle 361 always passes a specific train station at 8 a.m. on weekdays, etc.).

As shown in FIG. 3, the MS 380 stores the list of predictive RLOCs 390 received from the third party. In an embodiment, the third party registers the predictive RLOCs 394, 395 and 396 into the MS 380 using a LCAF encoded RLE type.

In an embodiment, the uploaded list of predictive RLOCs 390 by the third party utilizes a single EID associated with the vehicle 361 transporting the plurality of user devices 360. For example, the vehicle 361 in the FIG. 3 is represented by an EID 393. In such an embodiment, the vehicle 361 is treated as a container device for mapping in the MS 380. Hence, the vehicle 361 is treated as a container of multiple EIDs all moving along the same predictive path and fate sharing.

Each user device belonging to a passenger being transported by the vehicle 361 is associated with an EID in an address family (e.g., using an address family ID). For example, the first user device $360_1$ of the plurality of user devices 360 is associated with the EID1 391, and the second user device $360_2$ is associated with the EID2 392. The vehicle 361 transporting the passengers is associated with the EID 393, which contains both EID1 391 and EID2 392. All of the EIDs 391, 392 and 393 are stored in the MS 380 along with the list of predictive RLOCs 390. In an embodiment, the identities of all the EIDs being transported by the vehicle 361 (e.g., EID1 391, EID2 392, etc.) may also be masked by having the user devices join the group EID similar to a join of a multicast group.

In an embodiment, the EID 393 of the vehicle 361 stays the same as the vehicle moves from one location to the next. By way of example, assume that the MS 380 initially maps EID 393 of the vehicle 361 at location C with predictive RLOC 395, which contains xTR3. As the vehicle 361 associated with the EID 393 moves, the plurality of user devices 360 in the vehicle 361 may no longer be served by the LISP xTR3 included in the third S-GW 325 of the LISP network 300 of FIG. 3 and may begin to be served by the LISP xTR6 included in the fourth S-GW 331 of the LISP network 300 of FIG. 3. As shown in FIG. 3, xTR6 is included within RLOC 396. Therefore, the EID 393 is mapped by the MS 380 to the predictive RLOC 396 at the location D. Hence, the EID 393 of the vehicle 361 stays the same as the vehicle 361 moves from one location to the next.

In an embodiment, when the vehicle 361 moves only one of the user devices (e.g., $360_1$ or $360_2$) registers the new location with the MS 380 because the user devices within the vehicle 361 all share the same fate. As such, the MS 380 is not burdened with an update from every user device on the vehicle 361.

In an embodiment, each of the predictive RLOCs 394, 395, and 396 is represented using RLE. For example, the predictive RLOC 394 in the list of predictive RLOCs 390 indicates that the current network element serving the plurality of user devices 360 is xTR1 and that the predicted next network elements that will service the plurality of user device 360 will be xTR2 and xTR3. While two or three entries are shown in each of the predictive RLOCs, it should be recognized that any number of network elements may be included in the predictive RLOCs 394, 395 and 396. For example, the predictive RLOC 395 in the list of predictive RLOCs 390 could include xTR1, xTR2, xTR3, xTR6, and so on, in other embodiments.

Each predictive RLOC 394, 395, and 396 in the list of predictive RLOCs 390 includes the current network element serving the vehicle 361 and the one or more network elements that are predicted to service the vehicle 361 in the future as the vehicle 361 moves from the locations A through E. For example, RLOC 394 includes the current network element xTR1 serving the vehicle 361. RLOC 394 also includes the next two network elements, namely xTR2 and then xTR3, predicted to service the vehicle 361.

When there is a packet to be forwarded to the EID 393 based on a packet request from one of the plurality of user devices 360 within the vehicle 361, the network elements such as the first and second P-GWs 311 and 313 in the proximity of the vehicle 361 will replicate the packet and send the replicated packet to the network elements such as the first through fifth S-GWs 321, 323, 325, 331, and 333. In an embodiment, the edge network element 371 including the ITR1 may replicate the packet. After receiving the packet, the network elements, such as the first through fifth S-GWs 321, 323, 325, 331, and 333, will be able to reach the first user device $360_1$ using the EID 393 and according to the predictive RLOCs 394, 395, and 396 stored in the MS 380.

The packet will be transmitted by delivering one copy of the packet to the network element where the vehicle 361 was when the packet request was sent (e.g., the first through fifth S-GWs 321, 323, 325, 331, and 333) and delivering another copy of the packet to the network element where the vehicle 361 is predicted to be next (e.g., the first through fifth S-GWs 321, 323, 325, 331, and 333) based on the list of predictive RLOCs 390 stored in the MS 380.

As shown in FIG. 3, the position of the vehicle 361 associated with the EID 393 changes during travel from the location A to the location E. One of the user devices (e.g., the first user device $360_1$) from the plurality of user devices 360 in the vehicle 361 registers its EID1 391 with the first through fifth plurality of base stations 341, 343, 345, 351, and 353 or the first and second E-UTRANs 340 and 350. Therefore, the RTRs included in the network elements (e.g., the first and second P-GWs 311 and 313) or xTRs included in the network elements (e.g., the first through fifth S-GWs 321, 323, 325, 331, and 333) that are attempting to send packets to the first user device $360_1$ are able to start sending packets ahead of the current position of the vehicle 361, or stop sending packets if the vehicle 361 has passed the service area of the RTR or xTR. Moreover, the ITR and/or RTR are able to make adjustments to only send packets to the relevant xTRs (e.g., the xTRs able to reach the vehicle 361 containing the first user device $360_1$). As such, session continuity is maintained and the latency issues noted above are avoided.

An example embodiment of the present disclosure is implemented using the architecture of FIG. 3. To begin, the third party registers the list of predictive RLOCs 390 with the MS 380. Thereafter, the first user device $360_1$ from the plurality of user devices 360 within the vehicle 361 requests a packet, and the first P-GW 311 including RTR1 contacts the MS 380 to find out where the requested packet resides. The MS 380 determines the location of the desired packet and notifies the first P-GW 311 including the RTR1 of the location. Assuming that the requested packet is located at the LISP site 370 associated with the edge device 371 including the ITR1, the first P-GW 311 including RTR1 forwards the request for the data packet to the LISP site 370 associated with the edge device 371 including the ITR1.

Thereafter, the LISP site 370 associated with the edge device 371 including the ITR1 contacts the MS 380 to determine where to send the requested packet. The MS 380 consults the list of predictive RLOCs 390 and provides routing information for the requested packet to the LISP site 370 associated with the edge device 371 including the ITR1. The LISP site 370 associated with the edge device 371 including the ITR1 then transmits the requested packet based on the information received. For example, if the information indicated that vehicle 361 associated with EID 393 is in the coverage area corresponding to the first P-GW 311 including the RTR1, then the packet is sent there.

Once the packet is received, the RTR1 associated with first P-GW 311 duplicates the packet and transmits the packet according to the information received from the MS 380, which was based upon the list of predictive RLOCs 390. If the information received from the MS 380 indicated that RLOC 394 should be utilized due to the location of the vehicle 361, the first P-GW 311 including RTR1 sends a first copy of the packet to the first S-GW 321 including xTR1, a second copy of the packet to the second S-GW 323 including xTR2, and a third copy of the packet to the third S-GW 325 including xTR3. In this way, the first user device $360_1$ from the plurality of user devices 360 within the vehicle 361 is guaranteed to get the packet regardless of whether the vehicle 361 is at location A, location B, or location C.

For an example, consider a situation where the vehicle 361 of FIG. 3 is scheduled to be in an area served by the xTR2 at 8.00 a.m. on a weekday. Regardless of whether the vehicle 361 is on time and proximate xTR2, late and proximate xTR1, or early and proximate xTR3, the packet should be received by the first user device $360_1$ because there are copies of the packet at all three service areas xTR1, xTR2, and xTR3. In an embodiment, some buffering may be performed so that the packets are kept during a disconnection time in order to be more tolerant.

Figure 4:
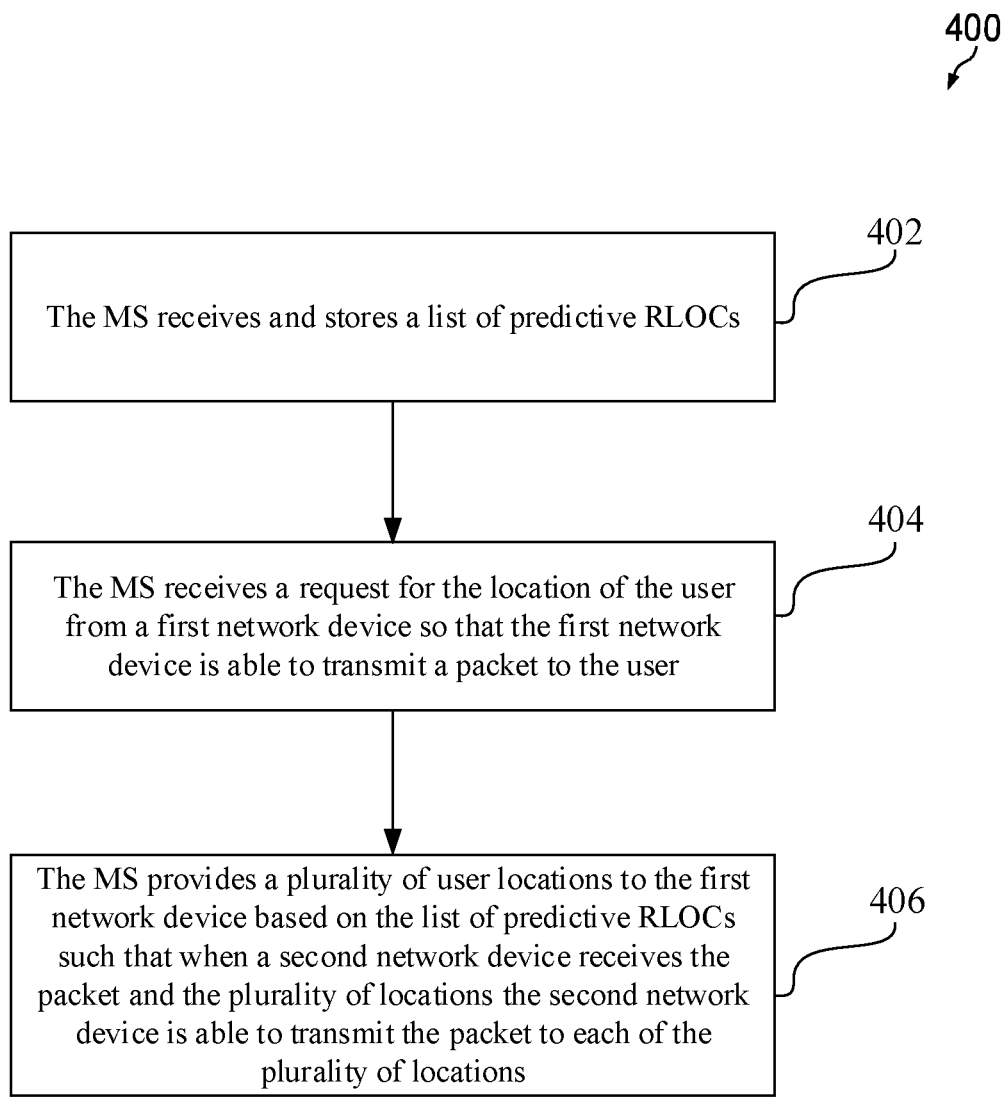
FIG. 4 is a method of utilizing a list of predictive RLOCs according to an embodiment of the present disclosure.

FIG. 4 is a method 400 of utilizing a list of predictive RLOCs. The method 400 is implemented by, for example, the MS 280 in FIG. 2 or the MS 380 in FIG. 3. The method 400 may be used when, for example, a user device has requested a packet or initiated a connection/session. In block 402, the MS receives and stores a list of predictive RLOCs. In an embodiment, the list of predictive RLOCs is received from the user device or a third party.

In block 404, the MS receives a request for the location of the user from a first network element so that the first network element is able to transmit a packet to the user. In an embodiment, the first network element may be the LISP site 270 in FIG. 2 or the LISP site 370 in FIG. 3. In block 406, the MS provides a plurality of user locations to the first network element based on the list of predictive RLOCs such that when a second network element receives the packet and the plurality of locations the second network element is able to transmit the packet to each of the plurality of locations. In an embodiment, the second network element may be the first or second P-GWs 211, 213 in FIG. 2 or the first or second P-GWs 311, 313 in FIG. 3. In an embodiment, the first or second P-GWs 211, 213 in FIG. 2 or the first or second P-GWs 311, 313 in FIG. 3 replicate the packet and send a copy to each location. In an embodiment, the LISP site 270 in FIG. 2 or the LISP site 370 in FIG. 3 may replicate the packet and transmit the replicated packet to the first or second P-GWs 211, 213 in FIG. 2 or the first or second P-GWs 311, 313 in FIG. 3. In an embodiment, a time mechanism may make this choice.

Figure 5:
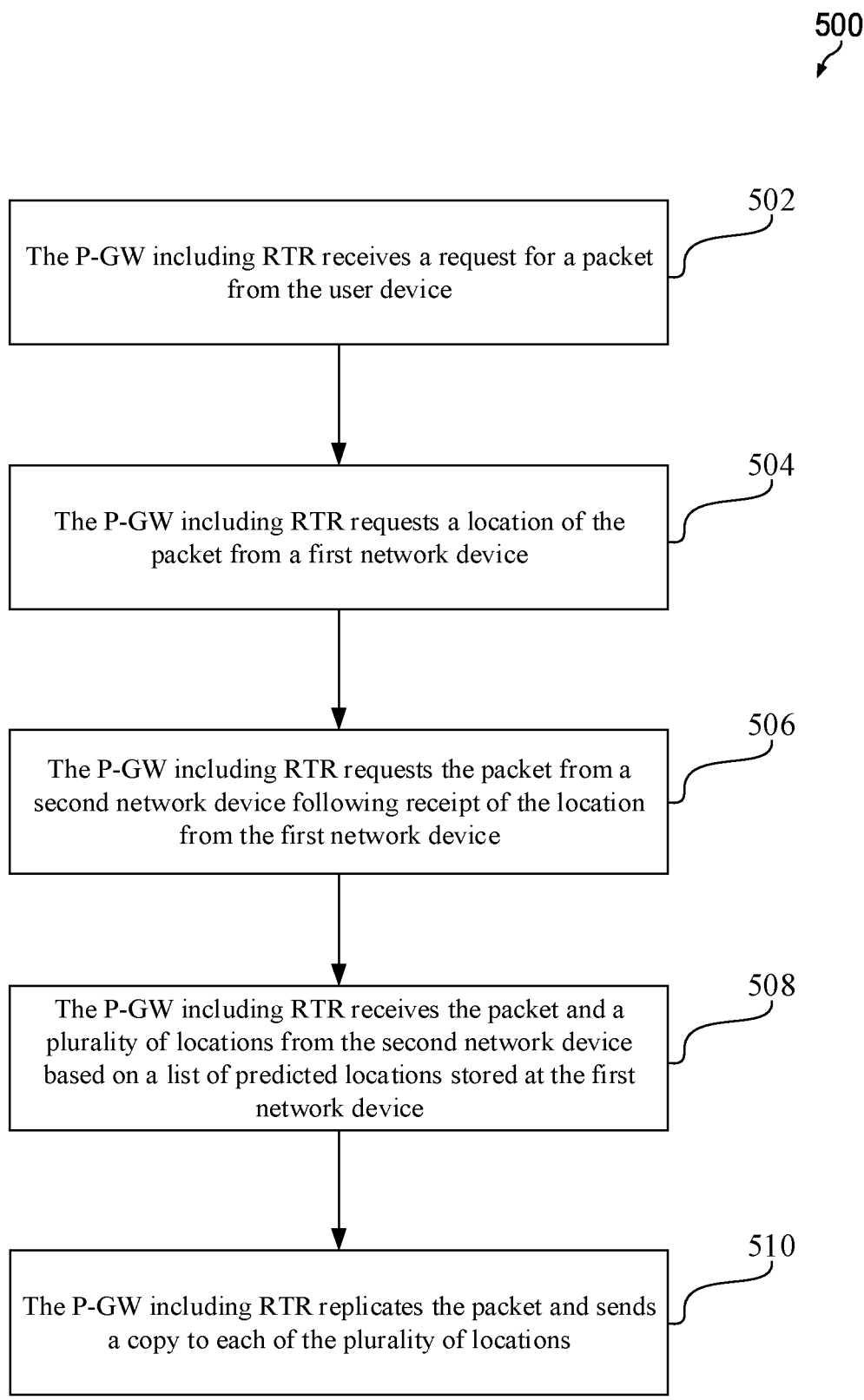
FIG. 5 is a method of utilizing a list of predictive RLOCs according to another embodiment of the present disclosure.

FIG. 5 is a method 500 of utilizing a list of predictive RLOCs. The method 500 is implemented by, for example, the first and second P-GWs 211 and 213 in FIG. 2 or the first and second P-GWs 311 and 313 in FIG. 3. The method 500 may be used when, for example, a user device (e.g., first user device 260, first user device $360_1$) has requested a packet or initiated a connection/session. In block 502, the P-GW (e.g., the first P-GW 211, 311) including RTR receives a request for a packet from the user device. In block 504, the P-GW including RTR requests a location of the packet from a first network element. In an embodiment, the first network element is the MS 280 in FIG. 2 or the MS 380 in FIG. 3. In block 506, the P-GW including RTR requests the packet from a second network element following receipt of the location from the first network element. In an embodiment, the second network element may be the edge network element 271 including the ITR1 at the LISP Site 270 in FIG. 2 or the edge network element 371 including the ITR1 at the LISP Site 370 in FIG. 3.

In block 508, the P-GW including RTR receives the packet and a plurality of locations from the second network element based on a list of predicted locations stored at the first network element. In an embodiment, the list of predicted locations was transmitted to the MS and stored prior to the packet request by, for example, the user device or a third party entity. In an embodiment, the list of predicted locations is a list of addresses or a list of RLOCs. In block 510, the P-GW including RTR replicates the packet and sends a copy to each of the plurality of locations. Because the packet is distributed to a variety of locations, the packet should be able to be delivered to the user device that requested the packet regardless of the location of the user device.

Figure 6:
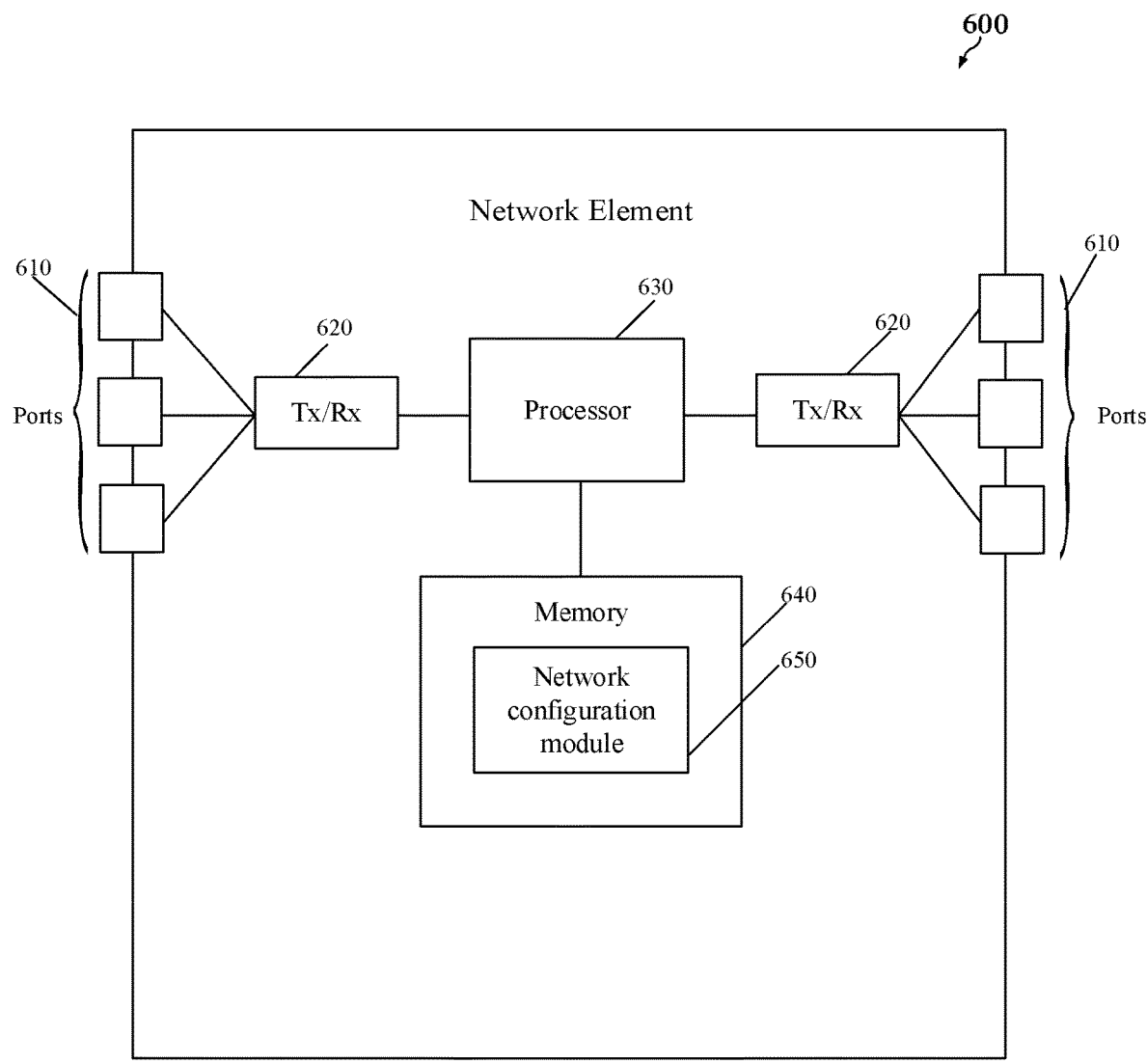
FIG. 6 is a schematic diagram of a network element according to various embodiments of the present disclosure.

FIG. 6 is a schematic diagram of a network element 600 configured to implement the disclosed embodiments, e.g., predictive routing. Network element 600 comprises ports 610, transceiver units (Tx/Rx) 620, a processor 630, and a memory 640 comprising a network configuration module 650. Ports 610 are coupled to Tx/Rx 620, which may be transmitters, receivers, or combinations thereof. The Tx/Rx 620 may transmit and receive data via the ports 610. Processor 630 is configured to process data. Memory 640 is configured to store data and instructions for implementing embodiments described herein. The network element 600 may also comprise electrical-to-optical (EO) components and optical-to-electrical (OE) components coupled to the ports 610 and Tx/Rx 620 for receiving and transmitting electrical signals and optical signals.

The processor 630 may be implemented by hardware and software. The processor 630 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 630 is in communication with the ports 610, Tx/Rx 620, and memory 640.

The memory 640 comprises one or more of disks, tape drives, and solid-state drives and may be used as an overflow data storage device, to store programs when such programs are selected for execution, and to store instructions and data that are read during program execution. The memory 640 may be volatile and non-volatile and may be read-only memory (ROM), random-access memory (RAM), ternary content-addressable memory (TCAM), and static random-access memory (SRAM). Network configuration module 650 is implemented by processor 630 to execute the instructions for implementing various embodiments previously discussed.

Upon review of this disclosure, those skilled in the art will appreciate that conventional mobility solutions attempt to address the mobility assuming random motion. In reality, most of the movement is predictable. In addition, there are many user devices that can be part of a larger container, which has a predictable path (e.g., train, plane, car, etc.). The present disclosure takes advantage of highly predictive paths and uses geolocation to optimize where to send the packets at a certain time. While the present disclosure has been described in the context of a LISP architecture, this disclosure is applicable to any mobile network using an ID with a locator or any ID oriented networks as well as conventional routing and forwarding where future paths might be stored. The principle of pre-registering paths and at any moment knowing the best forwarding router is applicable to all mobile technologies. The present disclosure will help ensure almost zero packet loss or ultra-low latency because it is possible to send a packet ahead of the fast moving mobile device. The present disclosure ensures session continuity for a highly mobile entity with ultra-low latency.

This present solution is based on an attempt at a "make-before-break" mechanism using knowledge of the movement of the mobile device (e.g., geolocation) and collaborating RLOCs. The solution relies on sending packets to both the current and predictive RLOC that the user will be attached to next or that has an overlap with its current RLOC. Because there are a limited number of P-GWs in use, the list of predictive RLOCs (a.k.a., predictive RLOC list) will be small if based on P-GW and will work for the fast mobility case. If the predictive RLOC is based on the base station (e.g., eNodeB) or other units such as roadside units, the RLOC list may be potentially longer, but the speed of movement will also be slower.

Further details of the present disclosure are disclosed in IETF document draft-farinacci-lisp-predictive-rlocs-01 titled, "LISP Predictive RLOCs," published Nov. 13, 2016, by D. Farinacci and P. Pillay-Esnault, which is incorporated herein by reference.

In embodiment, a method of utilizing a list of predictive paths by a map-server uses means for receiving the list of predictive paths, means for storing the list of predictive paths in a memory, means for receiving, from a first network element, a request for a location of a user device, the request related to transmitting a packet to the user device, and means for transmitting, to the first network element, a plurality of user locations based on the list of predictive paths, the plurality of user locations identifying where a second user device will transmit the packet when the packet is received by the second user device.

In an embodiment, a method of utilizing a list of predictive paths in a network uses means for receiving a request for a packet from a user device, means for requesting a location of the packet from a first network element, means for requesting the packet from a second network element following receipt of the location from the first network element, means for receiving the packet and a plurality of locations from the second network element, wherein the plurality of locations are based on the list of predictive paths stored at the first network element, and replicating the packet and sending a copy to each of the plurality of locations.

In an embodiment, a user device coupled to a routing table in an identification-oriented network includes memory means, processor means coupled to the memory means and configured to determine a list of Route Locator Addresses (RLOCs), and transmitter means coupled to the processor means and configured to transmit the list of RLOCs to the routing table for storage by the routing table. The list of RLOCs are utilized in routing packets through the identification-oriented network.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a user device in a network, comprising:
generating a list of route locator addresses (RLOCs) of a roaming endpoint identifier (EID), the roaming EID identifying the user device and the list of RLOCs comprising a predictive RLOC associated with a predictive location of the user device;
sending a current RLOC associated with a current location of the user device and the list of RLOCs to a mapping system (MS) in the network via a first ingress/egress router (xTR), the first xTR corresponding to the current RLOC; and
receiving a packet from a network element (NE) in the network via a second xTR in response to sending the list of RLOCs to the MS, wherein the second xTR corresponds to the predictive RLOC.

2. The method of claim 1, wherein the list of RLOCs is sent to the MS as a Locator/ID Separation Protocol (LISP) canonical address format (LCAF) encoded replication list entry (RLE) type.

3. The method of claim 1, wherein the current RLOC is an address of the first xTR, and wherein the predictive RLOC is an address of the second xTR.

4. The method of claim 1, further comprising sending a request for the packet to the NE before receiving the packet from the NE.

5. The method of claim 1, wherein the list of RLOCs comprises a plurality of predictive RLOCs, the method further comprising sending a copy of the packet to an xTR corresponding to each of the plurality predictive RLOCs.

6. The method of claim 1, wherein the list of RLOCs comprises a plurality of pairings between a possible current RLOC and a corresponding predictive RLOC, wherein one of the plurality of pairings comprises the current RLOC and the predictive RLOC.

7. The method of claim 1, further comprising determining the predictive RLOC based on the user device historically changing locations from the current location to the predictive location.

8. The method of claim 1, wherein the list of RLOCs further comprises the current RLOC.

9. A user device implemented in a network, comprising:
a memory storing instructions; and a processor coupled to the memory and configured to execute the instructions that, when executed by the processor, cause the user device to:
  generate a list of route locator addresses (RLOCs) of a roaming endpoint identifier (EID), wherein the roaming EID identifies the user device, wherein the list of RLOCs comprises a predictive RLOC associated with a predictive location of the user device;
  send a current RLOC associated with a current location of the user device and the list of RLOCs to a mapping system (MS) in the network via a first ingress/egress router (xTR), wherein the first xTR corresponds to the current RLOC; and
  receive a packet from a network element (NE) in the network via a second xTR in response to the list of RLOCs being sent to the MS, wherein the second xTR corresponds to the predictive RLOC.

10. The user device of claim 9, wherein the list of RLOCs is sent to the MS as a Locator/ID Separation Protocol (LISP) canonical address format (LCAF) encoded replication list entry (RLE) type.

11. The user device of claim 9, wherein the current RLOC is an address of the first xTR and the predictive RLOC is an address of the second xTR.

12. The user device of claim 9, wherein the instructions further cause the processor to send a request for the packet to the NE before receiving the packet from the NE.

13. The user device of claim 9, wherein the list of RLOCs comprises a plurality of predictive RLOCs, the instructions further causing the user device send a copy of the packet to an xTR corresponding to each of the plurality of predictive RLOCs.

14. The user device of claim 9, wherein the list of RLOCs comprises a plurality of pairings between a possible current RLOC and a corresponding predictive RLOC, wherein one of the plurality of pairings comprises the current RLOC and the predictive RLOC.

15. The user device of claim 9, wherein the instructions further cause the processor to determine the predictive RLOC based on one or more prior locations of the user device.

16. The user device of claim 9, wherein the list of RLOCs further comprises the current RLOC.

17. A method, comprising:
  generating a list of route locator addresses (RLOCs) of a roaming endpoint identifier (EID), wherein the roaming EID identifies a user device, the list of RLOCs comprising a predictive RLOC associated with a predictive location of the user device, the predictive RLOC corresponding to a first ingress/egress router (xTR);
  sending a current RLOC associated with a current location of the user device and the list of RLOCs to a mapping system (MS) in the network, the current RLOC corresponding to a second xTR;
  receiving, by the first xTR and the second xTR, a packet destined for the user device from a network element (NE) in the network in response to sending the list of RLOCs to the MS; and
  forwarding, by the first xTR, the packet to the user device.

18. The method of claim 17, wherein the list of RLOCs is sent to the MS as a Locator/ID Separation Protocol (LISP) canonical address format (LCAF) encoded replication list entry (RLE) type.

19. The method of claim 17, wherein the current RLOC is an address of the second xTR and the predictive RLOC is an address of the first xTR.

20. The method of claim 17, further comprising a request for the packet to the NE before receiving the packet from the NE.

21. The method of claim 17, wherein the list of RLOCs comprises a plurality of predictive RLOCs, the method further comprising sending a copy of the packet to an xTR corresponding to each of the plurality of predictive RLOCs.

22. The method of claim 17, wherein the list of RLOCs comprises a plurality of pairings between a possible current RLOC and a corresponding predictive RLOC, wherein one of the plurality of pairings comprises the current RLOC and the predictive RLOC.

23. The method of claim 17, wherein the list of RLOCs further comprises the current RLOC.

* * * * *

UNITED STATES PATENT AND TRADEMARK OFFICE
CERTIFICATE OF CORRECTION

| | |
|---|---|
| PATENT NO. | : 11,452,025 B2 |
| APPLICATION NO. | : 17/130855 |
| DATED | : September 20, 2022 |
| INVENTOR(S) | : Padmadevi Pillay-Esnault |

It is certified that error appears in the above-identified patent and that said Letters Patent is hereby corrected as shown below:

In the Claims

Column 18, Lines 51-54, Claim 5, should read:
5. The method of claim 1, wherein the list of RLOCs comprises a plurality of predictive RLOCs, the method further comprising sending a copy of the packet to an xTR corresponding to each of the plurality of predictive RLOCs.

Column 20, Lines 26-28, Claim 20, should read:
20. The method of claim 17, further comprising a request for the packet to be sent to the NE before receiving the packet from the NE.

Signed and Sealed this
Twenty-fifth Day of October, 2022

Katherine Kelly Vidal
*Director of the United States Patent and Trademark Office*